(12) United States Patent
Newman et al.

(10) Patent No.: US 11,468,352 B2
(45) Date of Patent: *Oct. 11, 2022

(54) METHOD AND SYSTEM FOR PREDICTIVE MODELING OF GEOGRAPHIC INCOME DISTRIBUTION

(71) Applicant: ADP, LLC, Roseland, NJ (US)

(72) Inventors: Kurt D. Newman, Columbus, GA (US); Debashis Ghosh, Charlotte, NC (US); Ramsay Cole, Brooklyn, NY (US)

(73) Assignee: ADP, Inc., Roseland, NJ (US)

( * ) Notice: Subject to any disclaimer, the term of this patent is extended or adjusted under 35 U.S.C. 154(b) by 997 days.

This patent is subject to a terminal disclaimer.

(21) Appl. No.: 16/194,715

(22) Filed: Nov. 19, 2018

(65) Prior Publication Data
US 2020/0160200 A1    May 21, 2020

(51) Int. Cl.
G06Q 30/02    (2012.01)
G06N 7/00    (2006.01)
G06F 17/18    (2006.01)
G06N 20/00    (2019.01)
G06F 16/29    (2019.01)

(52) U.S. Cl.
CPC ............... *G06N 7/00* (2013.01); *G06F 16/29* (2019.01); *G06F 17/18* (2013.01); *G06N 20/00* (2019.01); *G06Q 30/0202* (2013.01); *G06Q 30/0205* (2013.01)

(58) Field of Classification Search
CPC ........................ G06Q 30/0202; G06Q 30/0205
See application file for complete search history.

(56) References Cited

U.S. PATENT DOCUMENTS

| 7,954,698 B1* | 6/2011 | Pliha | G06Q 40/02 235/379 |
| 2003/0009368 A1* | 1/2003 | Kitts | G06Q 30/0205 705/7.34 |
| 2006/0242050 A1* | 10/2006 | Haggerty | G06Q 40/00 705/35 |
| 2007/0100719 A1* | 5/2007 | Chwast | G06Q 20/105 705/14.34 |
| 2017/0300948 A1* | 10/2017 | Chauhan | G06Q 10/087 |
| 2019/0164180 A1* | 5/2019 | Koell | G06Q 30/0205 |

OTHER PUBLICATIONS

"Learn how to go from Worst to First" (published on Feb. 23, 2016 at https://listingdomination.com/services/auto-targeting/) (Year: 2016).*
"Discretionary Spend Index" (published on Apr. 19, 2017 at https://www.datamangroup.com/discretionary-spend-index/) (Year: 2017).*

* cited by examiner

*Primary Examiner* — James M Detweiler
(74) *Attorney, Agent, or Firm* — Yee & Associates, P.C.

(57) ABSTRACT

A method, computer system, and computer program product that aggregates sample data regarding a plurality of factors associated with income and geographic location; performs iterative analysis on the sample data using machine learning to construct a predictive model; populates, using the predictive model, a database with predicted values of average income for a selected set of predefined geographic regions; converts the predicted values of average income in the database into percentages of observed values of average income for geographic regions within the selected set over a specified time period to create indices of average income; and rank orders the regions within the selected set according to their indices of average income.

22 Claims, 6 Drawing Sheets

METHOD AND SYSTEM FOR PREDICTIVE MODELING OF GEOGRAPHIC INCOME DISTRIBUTION

BACKGROUND INFORMATION

1. Field

The present disclosure relates generally to an improved computer system and, in particular, to a method and apparatus for machine learning predictive modeling. Still more particularly, the present disclosure relates to a method and apparatus for predicting income based on geography.

2. Background

Ideally marketing offers should be targeted to consumers with discretionary money to spend. However, determining where those consumers are with a high degree of probability is exceedingly difficult. Simply looking at a static snapshot of so called "high rent" areas provides a very simplistic model of approximately likely discretionary income.

Furthermore, different type of products are targeted at different types of markets. For example, products related to country living would not typically be marketed in urban areas. The challenge is determining the regions that have the most disposable income from among regions that are the most likely markets for specific products.

Therefore, it would be desirable to have a method and system that provides predictive modeling and indices that predict take average income across geographic regions that share predefined characteristics.

SUMMARY

An embodiment of the present disclosure provides a computer-implemented method for predictive modeling. The computer system aggregates sample data regarding a plurality of factors associated with income and geographic location and performs iterative analysis on the sample data using machine learning to construct a predictive model. The computer system then populates, using the predictive model, a database with predicted values of average income for a selected set of predefined geographic regions. The computer system converts the predicted values of average income in the database into percentages of observed values of average income for geographic regions within the selected set over a specified time period to create indices of average income. The computer system then rank orders the regions within the selected set according to their indices of average income.

Another embodiment of the present disclosure provides a machine learning predictive modeling system comprising a computer system and one or more processors running on the computer system. The one or more processors aggregate sample data regarding a plurality of factors associated with income and geographic location; perform iterative analysis on the sample data using machine learning to construct a predictive model; populate, using the predictive model, a database with predicted values of average income for a selected set of predefined geographic regions; convert the predicted values of average income in the database into percentages of observed values of average income for geographic regions within the selected set over a specified time period to create indices of average income; and rank order the regions within the selected set according to their indices of average income.

Another embodiment of the present disclosure provides a computer program product for machine learning predictive modeling comprising a persistent computer-readable storage media; first program code, stored on the computer-readable storage media, for aggregating sample data regarding a plurality of factors associated with income and geographic location; second program code, stored on the computer-readable storage media, for performing iterative analysis on the sample data using machine learning to construct a predictive model; third program code, stored on the computer-readable storage media, for populating, using the predictive model, a database with predicted values of average income for a selected set of predefined geographic regions; fourth program code, stored on the computer-readable storage media, for converting the predicted values of average income in the database into percentages of observed values of average income for geographic regions within the selected set over a specified time period to create indices of average income; and fifth program code, stored on the computer-readable storage media, for rank ordering the regions within the selected set according to their indices of average income.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that several factors affect income distribution across different geographic regions.

The illustrative embodiments further recognize and take into account that different types of products are targeted to different types of markets, requiring identification of the most lucrative target markets.

The illustrative embodiments further recognize and take into account that average disposable income can vary between regions with similar geographic and non-geographic characteristics.

Thus, a method and apparatus that would allow for accurately predicting average disposable income between regions sharing similar characteristics would fill a long-felt need in the field of marketing and institutional lending.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added, in addition to the illustrated blocks, in a flowchart or block diagram.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

Figures 1, 6:
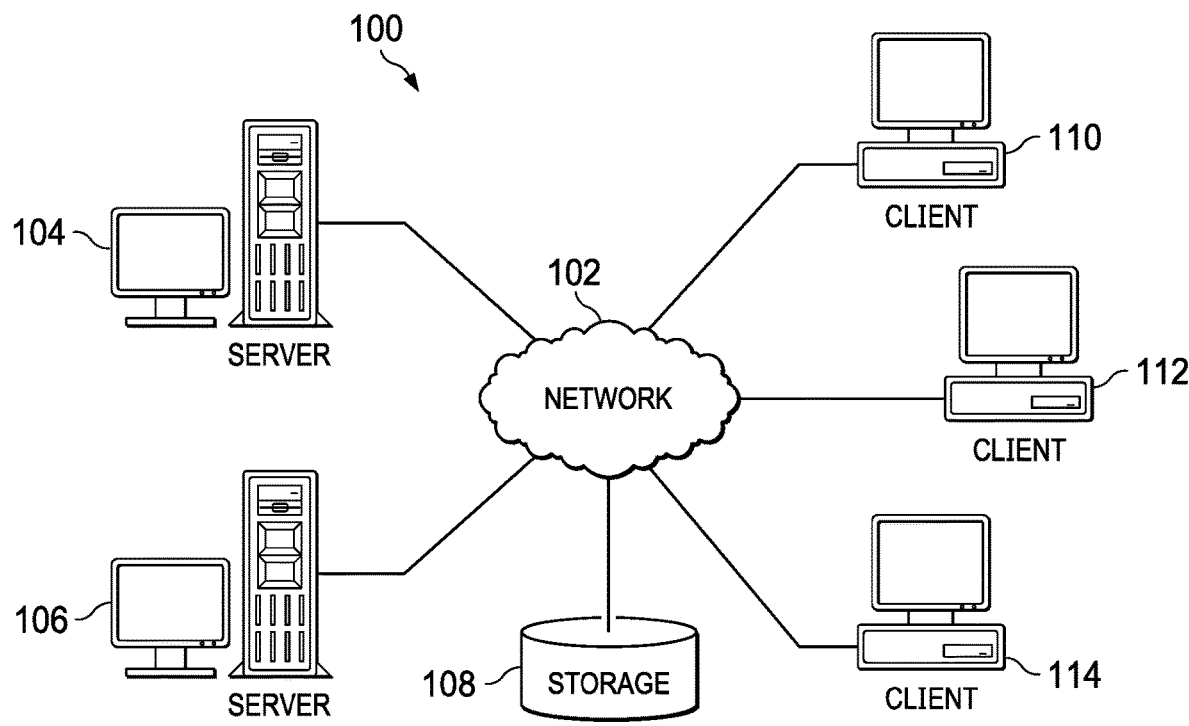
FIG. 1 is an illustration of a block diagram of an information environment in accordance with an illustrative embodiment.
FIG. 6 is an example table for use with a dataset in machine learning in accordance with an illustrative embodiment.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

The computer-readable program instructions may also be loaded onto a computer, a programmable data processing apparatus, or other device to cause a series of operational steps to be performed on the computer, a programmable apparatus, or other device to produce a computer implemented process, such that the instructions which execute on the computer, the programmable apparatus, or the other device implement the functions and/or acts specified in the flowchart and/or block diagram block or blocks.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, the program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
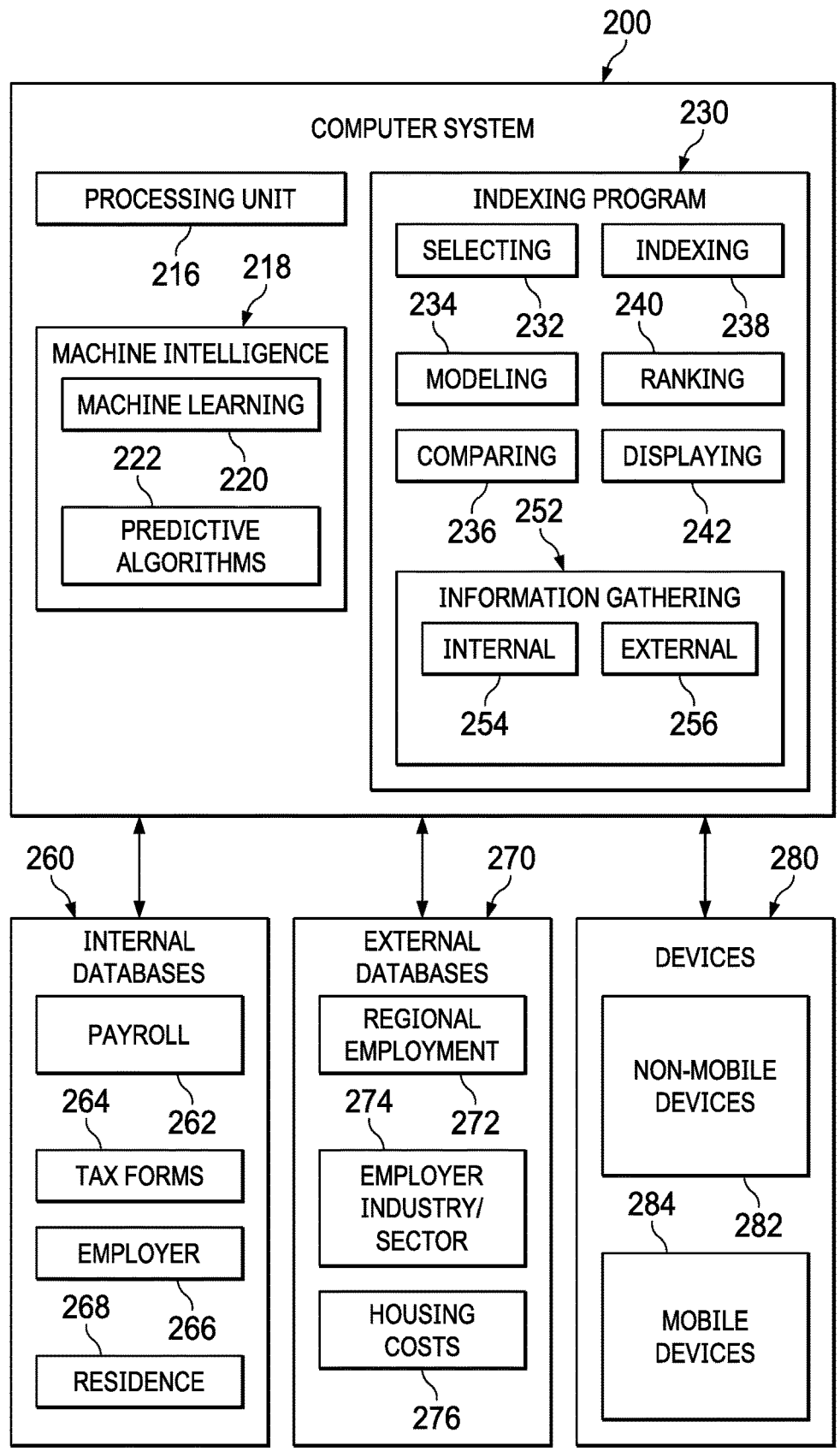
FIG. 2 is an illustration of a block diagram of a computer system for predictive modeling in accordance with an illustrative embodiment.

Turning to FIG. 2, a block diagram of a computer system for predictive modeling is depicted in accordance with an illustrative embodiment. Computer system 200 is connected to internal databases 260, external databases 270, and devices 280. Internal databases 260 comprise payroll 262, tax forms 264, employer information 266, and employee place of residence 268. External databases comprise regional employment databases 272, employer industry/sector databases 274, and regional housing cost databases 276. Devices 280 comprise non-mobile devices 282 and mobile devices 284.

Computer system 200 comprises information processing unit 216, machine intelligence 218, and indexing program 230. Machine intelligence 218 comprises machine learning 220 and predictive algorithms 222.

Machine intelligence 218 can be implemented using one or more systems such as an artificial intelligence system, a neural network, a Bayesian network, an expert system, a fuzzy logic system, a genetic algorithm, or other suitable types of systems. Machine learning 220 and predictive algorithms 222 may make computer system 200 a special purpose computer for dynamic predictive modelling of income according to geographic location.

In an embodiment, processing unit 216 comprises one or more conventional general purpose central processing units (CPUs). In an alternate embodiment, processing unit 216 comprises one or more graphical processing units (GPUs). Though originally designed to accelerate the creation of images with millions of pixels whose frames need to be continually recalculated to display output in less than a second, GPUs are particularly well suited to machine learning. Their specialized parallel processing architecture allows them to perform many more floating point operations per second then a CPU, on the order of 1000× more. GPUs can be clustered together to run neural networks comprising hundreds of millions of connection nodes.

Indexing program 230 comprises information gathering 252, selecting 232, modeling 234, comparing 236, indexing 238, ranking 240, and displaying 242. Information gathering 252 comprises internal 254 and external 256. Internal 254 is configured to gather data from internal databases 260. External 256 is configured to gather data from external databases 270.

Thus, processing unit 216, machine intelligence 218, and indexing program 230 transform a computer system into a special purpose computer system as compared to currently available general computer systems that do not have a means to perform machine learning predictive modeling such as computer system 200 of FIG. 2. Currently used general computer systems do not have a means to accurately predict income according to geographic region.

Figure 3:
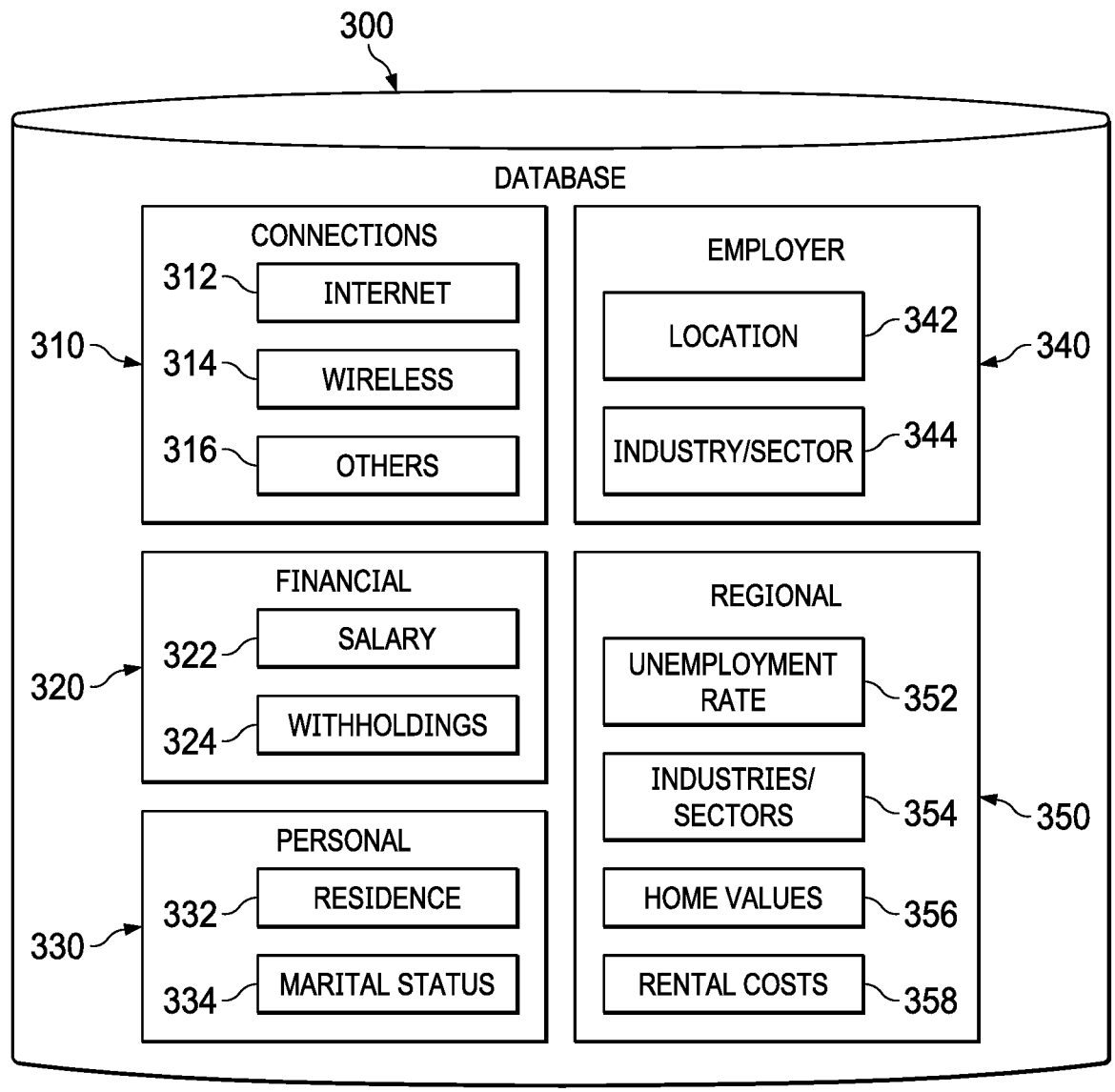
FIG. 3 is an illustration of a database for access by a predictive modeling application in accordance with an illustrative embodiment.

Turning to FIG. 3, a block diagram of a database is depicted in accordance with an illustrative embodiment. Database 300 comprises connections 310, employee personal data 320, financial data 330, and employment data 340. Connections 310 comprise internet 312, wireless 314, and others 316. Connections 310 may provide connectivity with internal databases 260, external databases 270, and devices 280 shown in FIG. 2. Internet 312 and wireless 314 as well as others 316 in connections 310 in FIG. 3 may connect with internal databases 260, external databases 270, and devices 280, shown in FIG. 2, through a network such as network 102 in FIG. 1. Others 316 may comprise any additional available means of connection other than internet 312 and wireless 314 such as a hard wired connection or a landline.

In an illustrative embodiment employee financial data 320 comprises the employee salary 322 and withholdings 324. Information regarding employee salaries is maintained in payroll 322. Information about the number and amount of deductions is maintained in payroll withholdings 324.

Employee personal information 330 comprises residence 322 and marital status 334. Information regarding the specific geographic region of employee residence is maintained in residence 332. The more specific and smaller the predefined region in questions (e.g., zip/postal code, state, multistate region, etc.), the more accurate the predictive model. Information about employee marital status is maintained in payroll marital status 324. Marital status can be extrapolated from tax filing status and/or from insurance and benefits forms.

Employer data 340 comprises the employer location 342 and industry/sector 344. Information regarding the employer's location (e.g., zip/postal code, state, multistate region, etc.) is maintained in location 342. This might not correspond exactly with employee region of residence. For example, some employees might work remotely. Another example is an employee who lives in the state of Connecticut but commutes to New York City for work. Information about the employer's industry/sector is maintained in industry/sector 344. A sector identifies a high-level group of related businesses. It can be thought of as a generic type of business. For example, the North American Industry Classification System (NAICS) uses a six digit code to identify an industry. The first two digits of that code identify the sector in which the industry belongs.

Regional data 350 comprises information about general economic trends within a predefined geographic region (e.g., zip/postal code, state, multistate region, etc.). Information regarding unemployment in the region is maintained in unemployment rate 352. Information regarding the types of industries/sectors within the region is maintained in industries/sectors 354. Information regarding home prices in the region is maintained in home values 356. Information regarding housing rental costs and rates for the region is maintained in rental costs 358.

Figure 4:
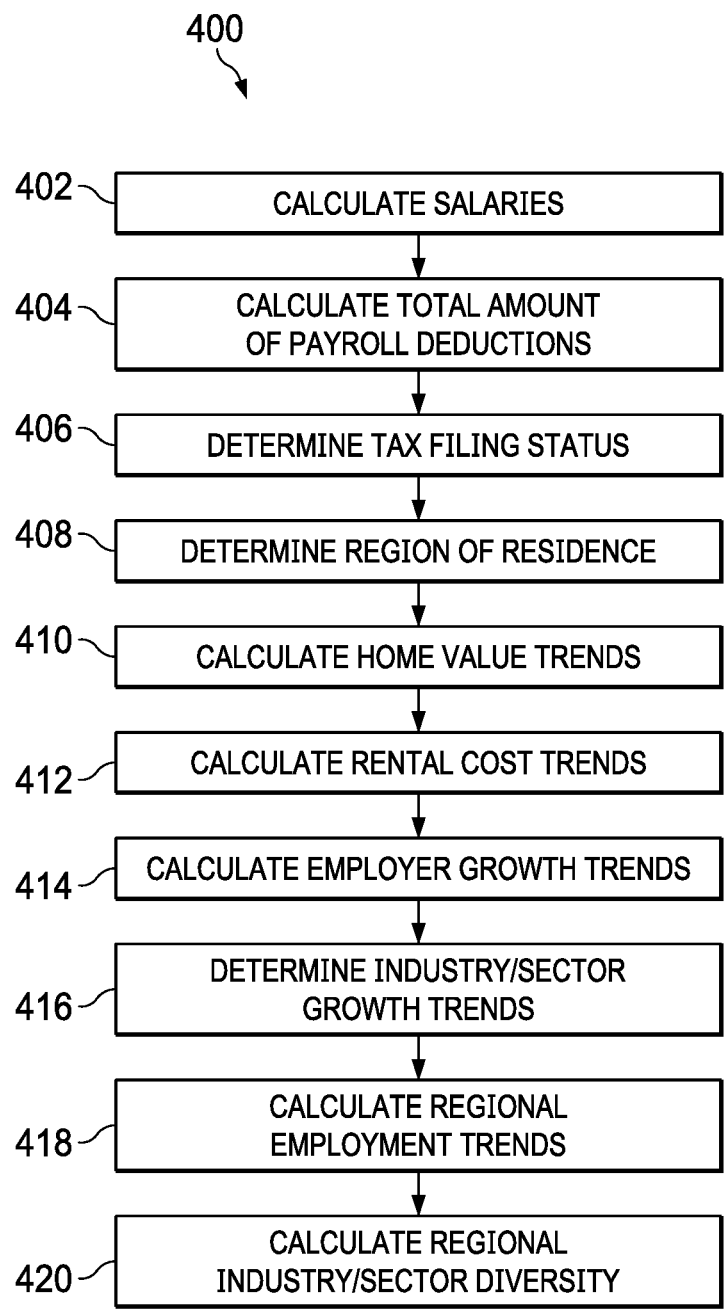
FIG. 4 is an illustration of a flowchart of a process for calculating factors used in predictive modeling in accordance with an illustrative embodiment.

Turning to FIG. 4, an illustration of a flowchart for calculating factors used in predictive modeling is depicted in accordance with an illustrative embodiment. This process can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1. Moreover, the process can be implemented by data processing system 700 in FIG. 7 and a processing unit such as processor unit 704 in FIG. 7.

It should be emphasized that the specific sequence of steps in the illustrative embodiment shown in FIG. 4 is chosen merely for convenience. The factors shown in FIG. 4 can be calculated independently in other orders or may be calculated in parallel by separate processors or processor threads, depending on the specific architecture of the computer system used. In the illustrative embodiment the factors are calculated using the information maintained in database 300 shown in FIG. 3.

Process 400 begins by calculating employee salary (step 402). Next, process 400 calculates the total amount of payroll deductions (step 404). These deductions can include retirement/savings, insurance deductions for family members, and similar items. Taking such withholdings into account gives a more accurate picture of employees' actual available funds for purchases and spending habits than simply nominal salary. It also has a bearing on the types of products being marketed. For example, a region (e.g., zip code) has an average nominal salary but also large average deductions for, e.g., retirement accounts, that region might not be a good target market for expensive sports cars or vacation packages but might be a good market for investment products, home improvement loans, or certain types of insurance policies.

Next, process 400 determines tax filing status (step 406). The tax filing status (i.e. single or joint) can indicate the presence (or lack thereof) of more than one income within a household.

Process 400 then determines the geographic region of residence (step 408). The size of the predefined region can vary in size (e.g., postal/zip code, city, state, multistate region, etc.). The smaller the region, the more precise the predictive model.

After the geographic region is determined, home value trends within that region are determined (step 410). Home value can be both a measure of wealth as well as a measure of living costs. Generally, as home values increase, the income of the owners increases as well. However, some people buy the most expensive house lenders will allow, pushing the limits of their available cash flow. Furthermore, the wealth effect of home value can reverse in an economic downturn marked by falling home values. Therefore, calculating trends over specified time periods produces more accurate predictive models than looking at a snapshot of housing costs and home values at a given point in time.

Process 400 also calculates rental cost trends in the region (step 412). Like home values, rental costs are representative of living expenses and overall income and lifestyle. Again, calculating trends produces more accurate predictive modelling of how income is trending in specific regions than a snapshot of rental costs at any given time.

Process 400 calculates growth trends for the employee's employer over a specified time period (step 414). This also points to the probable future income of an employee beyond a snapshot of current salary. Is the employer hiring, downsizing, and/or automating? In addition, if a particular employer accounts for a significant percentage of employment in the predefined region in question (e.g., "factory town"), growth trends for that employer might have a disproportionate effect on the predictive model for that region.

Next, process 400 calculates growth trends over a specified time period for the industry/sector in which the employee is employed (step 416). This measure helps capture non-local economic factors that might impact the local regional economy but might not be properly accounted for in the predictive model if only local data were used.

Employment trends for the selected region are calculated for the specified time period (step 418). Again, trends provide better predictive modelling than a momentary snapshot. For example, a region (e.g., zip code, city) might have a relatively high average income, but if unemployment in the area is on the rise, a predictive model that relied on that momentary current income would not be very accurate going forward.

Finally, process 400 calculates the diversity of industries/sectors within the selected region (step 420). This can include both the number of different industries/sectors in the region but also the percentages of employment for which they account. The diversity of industries/sectors of employment affects the potential upside or vulnerability of a region to trends in a particular industry/sector. Taken together with the other factors above, this measure can help the predictive model account for the interplay between local and non-local economic factors on the regional economy.

The method of the present disclosure utilizes machine learning and predictive algorithms such as those provided by machine intelligence 218 in FIG. 2. Machine learning is a branch of artificial intelligence (AI) that enables computers to detect patterns and improve performance without direct programming commands. Rather than relying on direct input commands to complete a task, machine learning relies on input data. The data is fed into the machine, a predictive algorithm is selected, parameters for the data are configured, and the machine is instructed to find patterns in the input data through trial and error. The data model formed from analyzing the data is then used to predict future values.

Figure 5:
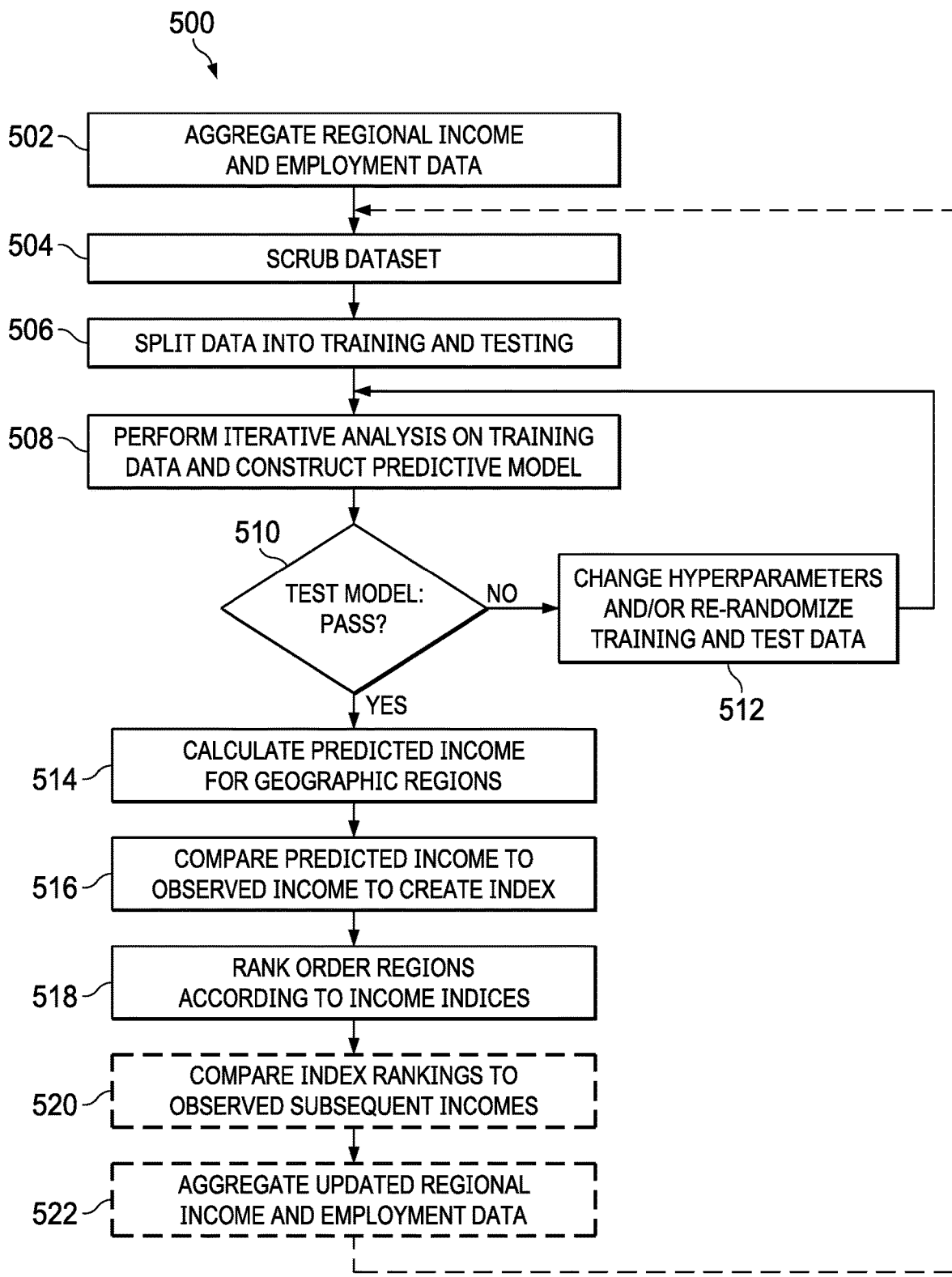
FIG. 5 is an illustration of a flowchart of a process for predictive modeling and indexing in accordance with an illustrative embodiment.

Turning to FIG. 5, an illustration of a flowchart of a process for predictive modeling and indexing is depicted in accordance with an illustrative embodiment. Process 500 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1. Moreover, the process can be implemented by data processing system 700 in FIG. 7 and a processing unit such as processor unit 704 in FIG. 7.

Process 500 begins by aggregating the regional income and employment data associated with the factors determined in the process flow in FIG. 4 (step 502). Referring to FIG. 6, an example table for use with a dataset in machine learning is depicted in accordance with an illustrative embodiment. The dataset used to form predictions is defined and labeled in a table such as table 600. Each column is known as a vector, and the data within each column is a feature, also known as a variable, dimension, or attribute. Each row represents a single observation of a given feature and is referred to as a case or value. The y values represent the output and are typically expressed in the final column as shown. For ease of illustration, the example shown in FIG. 6 is a simple 2-D table, but it should be noted that multiples vectors (forming matrices) are typically used to represent large datasets. Referring back to FIG. 4, each category of data determined in the process flow could be represented by a separate vector (column) in a tabular dataset depending on how the data is aggregated.

After the dataset is aggregated, process 500 scrubs the dataset (step 504). Very large datasets, sometimes referred to as Big Data, often contain noise and complicated data structures. Bordering on the order of petabytes, such datasets comprise a variety, volume, and velocity (rate of change) that defies conventional processing and is impossible for a human to process without advanced machine assistance.

Scrubbing refers to the process of refining the dataset before using it to build a predictive model and includes modifying and/or removing incomplete data or data with little predictive value. It can also entail converting text based data into numerical values (one-hot encoding) or convert numerical values into a category.

After the dataset has been scrubbed, process 500 divides the data into training data and test data to be used for building and testing the predictive model (step 506). To produce optimal results, the same data that is used to test the model should not be the same data used for training. The data is divided by rows, with 70-80% used for training and 20-30% used for testing. Randomizing the selection of the rows avoids bias in the model.

Process 500 then performs iterative analysis on the training date by applying predictive algorithms to construct a predictive model (step 508). There are three main categories of machine learning: supervised, unsupervised, and reinforcement. Supervised machine learning comprises providing the machine with test data and the correct output value of the data. Referring back to table 600 in FIG. 6, during supervised learning the values for the y column (output) are provided along with the training data (labeled dataset) for the model building process in step 508. The algorithm, through trial and error, deciphers the patterns that exist between the input training data and the known output values to create a model that can reproduce the same underlying rules with new data. Examples of supervised learning algorithms include regression analysis, decisions trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data no one previously knew existed. Examples of algorithms used in unsupervised machine learning include k-means clustering (k-NN), association analysis, and descending clustering.

After the model is constructed, the test data is fed into model to test its accuracy (step 510). In an embodiment the model is tested using mean absolute error, which examines each prediction in the model and provides an average error score for each prediction. If the error rate between the training and test dataset is below a predetermined threshold, the model has learned the dataset's pattern and passed the test.

If the model fails the test the hyperparameters of the model are changed and/or the training and test data are re-randomized, and the iterative analysis of the training data is repeated (step 512). Hyperparameters are the settings of the algorithm that control how fast the model learns patterns and which patterns to identify and analyze. Once a model has passed the test stage it is ready for application.

Whereas supervised and unsupervised learning reach an endpoint after a predictive model is constructed and passes the test in step 510, reinforcement learning continuously improves its model using feedback from application to new empirical data. Algorithms such as Q-learning are used to train the predictive model through continuous learning using measurable performance criteria (discussed in more detail below).

After the model is constructed and tested for accuracy, process 500 uses the model to calculate predicted average income for a set of predefined geographic regions (step 514). This set can comprise regions in close proximity to each other, such as several adjacent zip codes in and around a major metropolitan area or several adjacent counties within a state, etc. Alternatively, the regions included in the set might have similar characteristics other than geographic proximity, such as for example population size and/or density, industry/sector distributions, urban, rural, technology companies, heavy industry, agriculture, etc.

The predicted income for the set of regions is then converted into a percentage of observed incomes within the individual regions in the set to form an index (step 516). The index is calculated by dividing the observed value by the predicted value and then multiplying by 100. A percentage greater than 100% identifies a region that has greater disposable income than most regions within the set. A percentage less than 100% identifies geographic regions that have lower disposable income than most regions within the set.

After the indices have been calculated, they are used to rank order regions (step 518). Rank order allows comparison of average income between regions that have similar characteristics, whichever characteristics those happen to be as determined by the modeler. The characteristics are chosen according to the type of product being marketed. The regions with those characteristics that have the highest indices are likely to be the most lucrative target markets.

If reinforcement learning is used with the predictive modelling, the regional income rankings are compared to the actual observed regional incomes over a subsequent time period (e.g., month, quarter, year, etc.) (step 520). The actual income levels for the regions in question might not conform as expected to the relative index rankings. Furthermore, the sample data used to construct the predictive model might become outdated. Updated regional income and employment data is collected after the subsequent time period and fed back into the machine learning to update and modify the predictive model (step 522).

The illustrative embodiments thus produce the technical effect of constructing accurate, complex predictive models from large datasets and do so in a timely manner in the face of rapidly changing empirical data.

Figure 7:
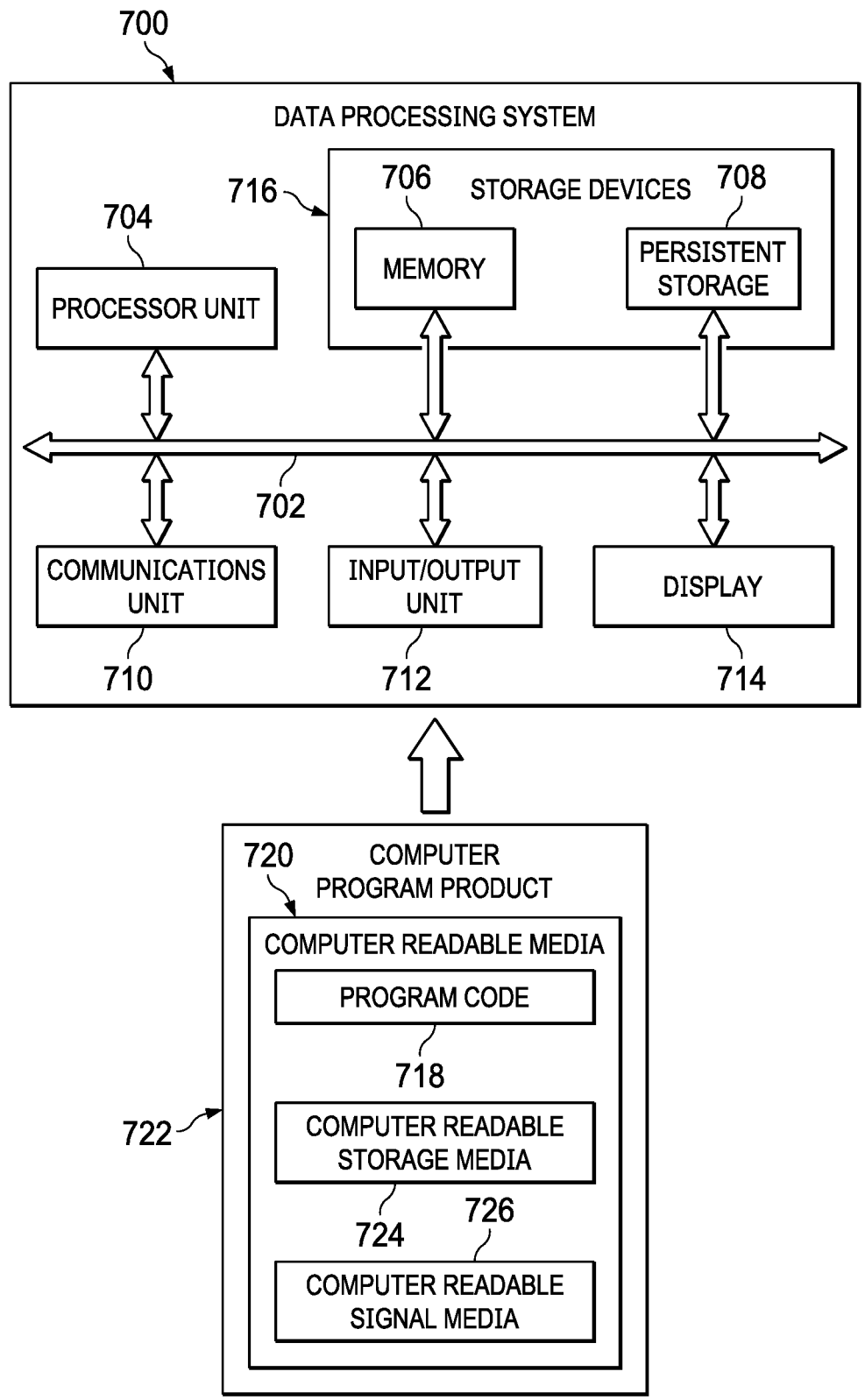
FIG. 7 is an illustration of a block diagram of a data processing system in accordance with an illustrative embodiment.

Turning now to FIG. 7, an illustration of a block diagram of a data processing system is depicted in accordance with an illustrative embodiment. Data processing system 700 may be used to implement one or more computers and client computer system 112 in FIG. 1. In this illustrative example, data processing system 700 includes communications framework 702, which provides communications between processor unit 704, memory 706, persistent storage 708, communications unit 710, input/output unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation. In an embodiment, processor unit 704 comprises one or more conventional general purpose central processing units (CPUs). In an alternate embodiment, processor unit 704 comprises one or more graphical processing units (CPUs).

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 716, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708. Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer-usable program code, or computer-readable program code that may be read and executed by a processor in processor unit 704. The program code in the different embodiments may be embodied on different physical or computer-readable storage media, such as memory 706 or persistent storage 708.

Program code 718 is located in a functional form on computer-readable media 720 that is selectively removable and may be loaded onto or transferred to data processing system 600 for execution by processor unit 704. Program code 718 and computer-readable media 720 form computer program product 722 in these illustrative examples. In one example, computer-readable media 720 may be computer-readable storage media 724 or computer-readable signal media 726.

In these illustrative examples, computer-readable storage media 724 is a physical or tangible storage device used to store program code 718 rather than a medium that propagates or transmits program code 718. Alternatively, program code 718 may be transferred to data processing system 700 using computer-readable signal media 726.

Computer-readable signal media 726 may be, for example, a propagated data signal containing program code 718. For example, computer-readable signal media 726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code 718.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for predictive modeling, the method comprising:

aggregating, by one or more processors, sample data regarding a plurality of factors associated with income and geographic location;

performing, by one or more processors, iterative analysis on the sample data using machine learning and one or more pre-defined hyperparameters to construct a predictive model comprising at least one member selected from the group consisting of a neural network, a Bayesian network, a decision tree, support vector machine, a fuzzy logic system and a genetic algorithm, the hyperparameters controlling how fast patterns are learned and which patterns to identify;

populating, by one or more processors using the constructed predictive model, a database with predicted values of average income for a selected set of pre-defined geographic regions;

converting, by one or more processors, the predicted values of average income in the database into percentages of observed values of average income for geographic regions within the selected set of predefined geographic regions over a specified time period to create indices of average income; and rank ordering, by one or more processors, the geographic regions within the selected set according to their indices of average income.

2. The method according to claim 1, further comprising:

comparing, by one or more processors, a rank ordering of the selected set of predefined geographic regions according to indices of average income to an observed rank ordering of said selected set of predefined geographic regions according to indices of average income over a second specified time period;

aggregating, by one or more processors, updated sample data over the second specified time period; and updating, by one or more processors, the predictive model using machine learning incorporating the updated sample data for the second specified time period.

3. The method according to claim 1, wherein the plurality of factors with which machine learning is used to construct the predictive model include at least one of:

salary;
total payroll deductions;
tax filing status;
region of residence;
home values within said region;
rental costs within said region;
employer growth trends;
industry/sector growth trends;
regional employment; and
industry/sector diversity within said region.

4. The method according to claim 1, wherein the selected set of predefined geographic regions are selected according to geographic proximity.

5. The method according to claim 1, wherein the selected set of predefined geographic regions are selected according to shared, non-geographic characteristics.

6. The method according to claim 1, wherein the machine learning uses supervised learning to construct the predictive model.

7. The method according to claim 1, wherein the machine learning uses unsupervised learning to construct the predictive model.

8. The method according to claim 1, wherein the machine learning uses reinforcement learning to construct the predictive model.

9. A machine learning predictive modeling system, comprising:

a computer system including a memory;
one or more processors running on the computer system, the one or more processors configured to aggregate sample data regarding a plurality of factors associated with income and geographic location to the memory; perform iterative analysis on the sample data using machine learning and one or more pre-defined hyperparameters to construct a predictive model comprising at least one member selected from the group consisting of a neural network, a Bayesian network, a decision tree, support vector machine, a fuzzy logic system and a genetic algorithm, the hyperparameters controlling how fast patterns are learned and which patterns to identify; populate, using the constructed predictive model, a database with predicted values of average income for a selected set of predefined geographic regions; convert the predicted values of average income in the database into percentages of observed values of average income for geographic regions within the selected set of predefined geographic regions over a specified time period to create indices of average income; and rank order the geographic regions within the selected set according to their indices of average income.

10. The machine learning predictive modeling system according to claim 9, wherein the one or more processors running on the computer system compare a rank ordering of the selected set of predefined geographic regions according to indices of average income to an observed rank ordering of said selected set of predefined geographic regions according to indices of average income over a second specified time period.

11. The machine learning predictive modeling system according to claim 9, wherein the one or more processors comprise aggregated graphical processor units (GPU).

12. The machine learning predictive modeling system according to claim 9, wherein the machine learning uses supervised learning to construct the predictive model.

13. The machine learning predictive modeling system according to claim 9, wherein the machine learning uses unsupervised learning to construct the predictive model.

14. The machine learning predictive modeling system according to claim 9, wherein the machine learning uses reinforcement learning to construct the predictive model.

15. A computer program product for machine learning predictive modeling, the computer program product comprising:

a persistent computer-readable storage media;
first program code, stored on the computer-readable storage media, for aggregating sample data regarding a plurality of factors associated with income and geographic location;
second program code, stored on the computer-readable storage media, for performing iterative analysis on the sample data using machine learning and one or more pre-defined hyperparameters to construct a predictive model comprising at least one member selected from the group consisting of a neural network, a Bayesian network, a decision tree, support vector machine, a fuzzy logic system and a genetic algorithm, the hyperparameters controlling how fast patterns are learned and which patterns to identify;
third program code, stored on the computer-readable storage media, for populating, using the constructed predictive model, a database with predicted values of average income for a selected set of predefined geographic regions;
fourth program code, stored on the computer-readable storage media, for converting the predicted values of average income in the database into percentages of observed values of average income for geographic regions within the selected set of predefined geographic regions over a specified time period to create indices of average income; and
fifth program code, stored on the computer-readable storage media, for rank ordering the geographic regions within the selected set according to their indices of average income.

16. The computer program product according to claim 15, further comprising:

sixth program code, stored on the computer-readable storage media, for comparing a rank ordering of the selected set of predefined geographic regions according to indices of average income to an observed rank ordering of said selected set of predefined geographic regions according to indices of average income over a second specified time period;

seventh program code, stored on the computer-readable storage media, for aggregating updated sample data over the second specified time period; and eighth program code, stored on the computer-readable storage media, for updating the predictive model using machine learning incorporating the updated sample data for the second specified time period.

17. The computer program product according to claim 15, wherein the plurality of factors with which machine learning is used to construct the predictive model include at least one of:

salary;
total payroll deductions;
tax filing status;
region of residence;
home values within said region;
rental costs within said region;
employer growth trends;
industry/sector growth trends;
regional employment; and
industry/sector diversity within said region.

18. The computer program product according to claim 15, wherein the selected set of predefined geographic regions are selected according to geographic proximity.

19. The computer program product according to claim 15, wherein the selected set of predefined geographic regions are selected according to shared, non-geographic characteristics.

20. The computer program product according to claim 15, wherein the machine learning uses supervised learning to construct the predictive model.

21. The computer program product according to claim 15, wherein the machine learning uses unsupervised learning to construct the predictive model.

22. The computer program product according to claim 15, wherein the machine learning uses reinforcement learning to construct the predictive model.

* * * * *